A. Parker,
Wood Plane Attachment.
Nº 44,110.     Patented Sep. 6, 1864.

Witnesses:
Wm Joslin
G. W. Dunham

Inventor:
Andrew Parker

UNITED STATES PATENT OFFICE.

ANDREW PARKER, OF CLEVELAND, OHIO.

IMPROVEMENT IN FEED-ROLLERS FOR SAW AND PLANING MACHINES.

Specification forming part of Letters Patent No. 44,110, dated September 6, 1864; antedated September 1, 1864.

*To all whom it may concern:*

Be it known that I, ANDREW PARKER, of Cleveland, in the county of Cuyahoga and State of Ohio, have invented a new and useful Improvement in Feed-Rollers for Sawing and Planing Mills; and I do hereby declare that the following is a full and exact description thereof, reference being had to the accompanying drawings, and to the letters of reference marked thereon, making part of this specification.

The nature of my invention consists in a series of sectional rubber rollers and washers or disks, fastened alternately upon a shaft for the purpose of a feed-roller for resawing or planing mills.

Figure 1:
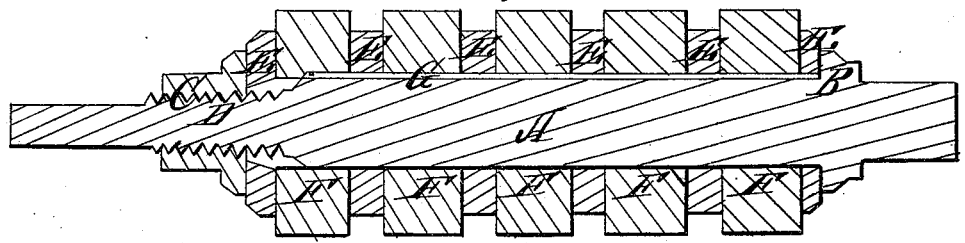
Figure 2:
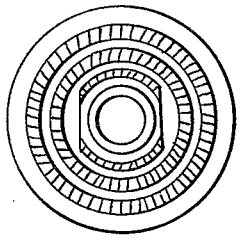
Figure 3:
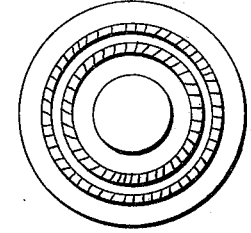
Figure 4:
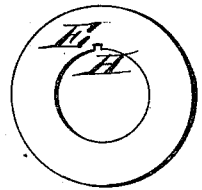
Figure 5:
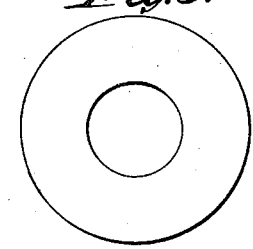

Figure 1 is a sectional view taken lengthwise through the center. Fig. 2 is an end view of the end upon which the nut works. Fig. 3 is an end view of the collar end. Fig. 4 is a view of the washer or disk. Fig. 5 is an end view of a sectional rubber roller.

A in Fig. 1 is the shaft upon which the rubber rollers and washers or disks are fastened. B in Fig. 1 is a fixed collar upon the shaft A. G is a fixed key or feather upon the shaft A. E E E E E are washers or disks, having center holes and keyways, as shown at H in Fig. 4, which allow them to slip freely upon the shaft A without turning thereon. F F F F F are sectional rubber rollers with center holes, as shown in Fig. 5. Being elastic they slip upon the shaft A without keyways. C is a nut working in the screw D upon the shaft A. When the washers or disks and sectional rubber rollers are placed alternately upon the shaft A, as shown in Fig. 1, the nut is then screwed against the adjoining washer or disk, which causes a tight pressure upon all the washers or disks and rubber rollers between the nut C and collar B. The rubber rollers are made somewhat larger in diameter than the disks or washers, which causes them to come in contact with the lumber to be sawed or planed without the washers or disks coming in contact therewith. By this arrangement I am enabled to make a very good and efficient feed-roller. The roller may be geared to a sawing or planing mill or machine in the same manner as the common feed rollers are.

After thus describing my invention, what I claim, and wish to secure by Letters Patent, is—

The combination of the sectional rubber rollers F and washers or disks E with the shaft A, when two or more rubber rollers are used, as herein set forth.

ANDREW PARKER.

Witnesses:
WM. JOSLIN,
G. H. BENHAM.